United States Patent Office 3,215,733
Patented Nov. 2, 1965

3,215,733
OXIDATION OF ALKANES AND ALKYL AROMATICS TO ALIPHATIC AND AROMATIC ACIDS
Alexander F. MacLean, Charles C. Hobbs, Jr., and Adin L. Stautzenberger, Corpus Christi, Tex., assignors to Celanese Corporation of America, New York, N.Y., a corporation of Delaware
No Drawing. Filed June 5, 1961, Ser. No. 114,612
1 Claim. (Cl. 260—524)

This invention relates to partial oxidation in the liquid phase of lower aliphatic hydrocarbons and more particularly to a liquid phase process in which lower alkanes and alkyl benzene compounds are simultaneously oxidized to produce both acetic acid and aromatic carboxylic acids.

It is an object of this invention to provide a process for the simultaneous production of acetic acid and aromatic carboxylic acids.

It is another object of this invention to provide a process for the simultaneous production of acetic acid and terephthalic acid.

Other objects will be apparent from the following detailed description and claim. In this description and claim, all proportions are by weight unless otherwise indicated.

A process for the partial oxidation of lower alkanes in the liquid phase to produce acetic acid has been described in U.S. Patent No. 2,653,962 and British Patent 709,674. Basically, the lower alkanes to be oxidized are usually placed in a reaction vessel and air or oxygen is instructed therein to effect the desired oxidation to form acetic acid, together with various ketones, alcohols and esters. The oxidation reaction is favored by elevated temperatures and high pressures, preferably in the range from about 200 to 2000 p.s.i.a. The acetic acid produced is distilled overhead in a mixture which includes the other oxygenated compounds formed, water, inert gases and unreacted hydrocarbon. The acetic acid is then separated from the distillate. While this may be effected, for example, by fractional distillation, azeotropic distillation, or extraction, it is preferable, according to the process of the above patents to permit the distillate to separate into two phases, recycle the organic phase to the reaction mixture and remove the acetic product from the water phase. This is preferably accomplished by distillation.

We have now found that aromatic carboxylic acids particularly dicarboxylic acids may be produced in above described liquid phase partial oxidation process simultaneously with the production of acetic acid. In accordance with one aspect of our invention, the oxygen containing gas is passed through a liquid reaction mixture comprising the alkane and an alkyl benzene preferably a dialkyl benzene, particularly p-xylene, to produce, after the acetic acid-containing vapors have been removed as heretofore described, a residue containing a dicarboxylic acid such as terephthalic acid.

According to a particular aspect of this invention, air is continuously passed through a reaction zone containing solution comprising an alkane having less than six carbons and p-xylene, preferably dissolved in an acetic acid medium. The solution is maintained at an elevated temperature. In accordance with the practice set forth hereinabove, an acetic acid-containing vapor is permitted to continuously distill overhead and acetic acid is separated therefrom and the hydrocarbons are recycled to the reaction mixture as previously described. The terephthalic acid formed is insoluble in the reaction mixture and precipitates. The terephthalic acid product is preferably obtained by continuously removing a portion of the remaining reaction mixture and separating the terephthalic acid therefrom. This may be conveniently accomplished by filtration. The filtered reaction mixture may then be recycled to the reaction zone. Fresh reactants are continuously furnished to the reaction zone.

Lower alkanes, preferably having 5 or less carbons and most preferably 3 to 5 carbons are advantageously used in the practice of this invention. Alkanes such as propane, n-butane, isobutane, and n-pentane give excellent results.

All or any portion of the p-xylene may be replaced by p-toluic acid in the practice of this invention to produce terephthalic acid.

It has been found that the presence of a ketone, such as methyl ethyl ketone or acetone in the reaction mixture gives better results. Preferably, the ketone is present in minor amounts, most preferably from about 5 to 15% of the reaction mixture.

The oxidation reaction is preferably conducted in the presence of an oxidation catalyst, preferably a metal catalyst and most preferably a salt of a varivalent metal. Cobalt, chromium and manganese salts or combinations of such salts provide excellent catalysts. Salts of iron, and nickel may also be used. Best results are obtained when the salts are soluble in the reaction mixture e.g. cobalt acetate, chromium acetate or manganeses acetate.

It is most preferable that the oxidation process be conducted under high pressures, advantageously in the range of from 200 to 2000 pounds per square inch absolute and most preferably from 600 to 1000 p.s.i.a. The temperatures of the oxidation are preferably from 150 to 250° C. and most preferably from 160 to 220° C.

While air is preferably employed as the oxidizing agent, undiluted oxygen may also be employed. Furthermore, the oxygen may be diluted with any desirable amount of an inert gas, such as nitrogen, the concentration of the nitrogen in the oxidizing gas being present in an amount which may be either more or less than the usual concentration of nitrogen in air. Preferably, there are introduced about 2.5 to 3 moles of oxygen per mole of fresh alkane introduced. Also, preferably from about 0.05 to about 0.2 mole of fresh dialkyl benzene are introduced for each mole of fresh alkane added. The inert solvent preferably constitutes from about 40 to 75% of the total reaction mixture under steady state conditions.

The reaction time or the residence time of the reactants in the reactor in the continuous reaction is preferably from 10 to 200 minutes and most preferably from 25 to 100 minutes.

In order to condense the acetic acid-containing overhead vapors from the oxidation reaction, a condenser is provided which is maintained at a temperature which is sufficiently low to ensure the condensation of all of the condensable components in the vapors. A condenser temperature below 70° C. is preferable. The overhead vapors comprise acetic acid and other alkane oxidation products, unreacted hydrocarbon, water, and where p-xylene is being oxidized to terephthalic acid, the vapors also comprise p-xylene and p-tolualdehyde. Separation is effected as heretofore described and the organic phase comprising unreacted hydrocarbon, p-xylene and p-tolualdehyde is recycled to the reaction mixture. The terephthalic acid and intermediates, other than p-tolualdehyde, in the oxidation of p-xylene to terephthalic acid are high boiling and do not distill under the preferred conditions of temperature and pressure. Most of the p-xylene and tolualdehyde in the vapors will be in the organic phase of the two-phased distillate in the above described separation method and will be recycled to the reaction mixture in said organic phase. However, it has been found that some p-xylene will enter the aqueous phase containing the acetic acid from which said xylene would have to be separated e.g. by azeotropic distillation. In order to avoid such losses of p-xylene to the aqueous phase, it has, in many instances, been found to be advantageous to use p-toluic acid which is not volatile under the preferred conditions of this process to replace all or part of the p-xylene. Also p-xylene may be first oxidized to p-toluic acid in an independent reaction and then the p-toluic acid used in the process.

The following examples are given to further illustrate this invention.

*Example I*

2.44 moles of p-xylene and 10 moles of n-pentane, both in 25.4 moles of acetic acid containing 3.6 moles of methyl ethyl ketone are oxidized at a pressure of 800 p.s.i.g. and a temperature of 180 to 200° C. with air passing through the reaction mixture at the rate of 24 standard cubic feet per hour for a period of 2½ hours in the presence of a catalyst comprising cobalt acetate and chromium acetate, the cobalt and chromium each comprising 0.015% of the total weight of the reaction mixture. The vapors coming overhead are condensed, at the pressure of the reactor, by passing said vapors through a condenser maintained at 40° to 70° C. and the non-aqueous phase of the condensate are returned continuously to the reactor. The aqueous phase of the condensate is distilled at atmospheric pressure to recover acetic acid. A white precipitate forms in the reactor, this is removed from the reaction mixture by filtration and dried. The precipitate is over 98% terephthalic acid.

*Example II*

Example I is repeated under the same conditions and proportions except that n-butane is reacted instead of n-pentane. The same results are obtained.

*Example III*

Following the procedure of Example I, 0.52 mole of p-toluic acid and 11.0 moles of n-pentane, both in 27.2 moles of acetic acid containing 3.6 moles of methyl ethyl ketone are oxidized under the same conditions of pressure, temperature and time with the same quantities of air and catalyst as set forth in Example I. The same products were produced as in Example I.

*Example IV*

To a reactor operating at a temperature of 180° C. and a pressure of 800 p.s.i.a. and containing 63 parts of glacial acetic acid, there is introduced a mixture containing 91% n-butane, and 9% p-toluic acid at the rate of 11.7 parts per minute. Simultaneously air is introduced into the reactor at the rate of 15 parts per minute. Cobalt acetate and chromium acetate are added to the reaction mixture at a rate sufficient to maintain a concentration of 0.015% for each based on the total reaction mixture weight. Vapors continuously distill overhead at the rate of 25 parts per minute and are condensed at a pressure of 800 p.s.i.a. and a temperature of 65° to 70° C. in a condenser. The uncondensed gases comprising air, nitrogen, $CO_2$, $O_2$, butane and CO are vented and the non-aqueous phase of the condensate is continuously returned to the reactor at the rate of 5 parts per minute. The aqueous phase of the condensate is withdrawn from the condenser and the acetic acid is separated therefrom. A portion of the reaction mixture is continuously withdrawn at the rate of 10 parts per minute. The mixture is filtered to separate the precipitated terephthalic acid product and the filtrate is recycled to the reactor at the rate of 8.77 parts per minute.

While the foregoing description has emphasized the production of terephthalic acid from p-xylene, it will be understood that other alkyl benzenes may be used in place of p-xylene to produce other aromatic carboxylic acids. For example, the process of this invention may be used in the production of isophthalic acid from meta-xylene, phthalic acid from ortho-xylene and benzoic acid from toluene.

It is to be understood that the foregoing detailed description is given merely by way of illustration and that many variations may be made therein without departing from the spirit of our invention.

Having described our invention, what we desire to secure by Letters Patent is:

Process for the cooxidation of an alkane having 3 to 5 carbon atoms and at least one aromatic compound selected from the group consisting of p-xylene and p-toluic acid which process comprises continuously introducing molecular oxygen, said alkane and said aromatic compound into a reaction zone containing acetic acid and a heavy metal catalyst for said oxidation selected from the group consisting of cobalt, chromium, manganese and mixtures thereof dissolved in said acetic acid; said aromatic compound being introduced in a proportion of about 0.05 to about 0.2 mole per mole of said alkane, oxygen being introduced in a proportion of about 2.5 to 3 moles per mole of said alkane and said reaction mixture consisting of about 40 to 75% by weight of acetic acid; maintaining said reaction zone at about 600 to 1000 p.s.i.a. and about 150 to 250° C.; maintaining said reactants in said reaction zone for a residence time of about 10 to 200 minutes; continuously taking two product streams from said reaction zone, a vapor stream overhead containing unreacted alkane, acetic acid and partial oxidation products of said alkane, and a bottoms stream containing terephthalic acid and the liquid reaction mixture; condensing said overhead stream into aqueous and hydrocarbon components; recycling said hydrocarbon component to said reactor; distilling said aqueous component to recover product acetic acid therefrom; recovering the product terephthalic acid from said bottoms product as a solid; and recycling to said reaction zone the liquid remaining from said bottoms product after removing said terephthalic acid solid product.

References Cited by the Examiner

UNITED STATES PATENTS

| | | | |
|---|---|---|---|
| 2,245,528 | 6/41 | Loder | 260—524 |
| 2,265,948 | 12/41 | Loder | 260—533 |
| 2,653,962 | 9/53 | Mitchell et al. | 260—533 X |
| 2,802,859 | 8/57 | Fetterly | 260—224 X |
| 2,920,087 | 1/60 | Hay | 260—533 X |
| 2,926,191 | 2/60 | Lawson-Hall | 260—533 |
| 2,962,361 | 11/60 | Spiller et al. | 260—524 X |
| 3,064,044 | 11/62 | Baldwin | 260—524 X |

LORRAINE A. WEINBERGER, *Primary Examiner.*

LEON ZITVER, *Examiner.*